(12) United States Patent
Wang et al.

(10) Patent No.: US 10,848,721 B2
(45) Date of Patent: Nov. 24, 2020

(54) LASER PROJECTION DEVICE AND LASER PROJECTION SYSTEM

(71) Applicant: GOERTEK INC., Shandong Province (CN)

(72) Inventors: Zhe Wang, Shandong Province (CN); Xiaoyang Zhang, Shandong Province (CN); Quanbo Zou, Shandong Province (CN)

(73) Assignee: GOERTEK INC., Shandong Province (CN)

( * ) Notice: Subject to any disclaimer, the term of this patent is extended or adjusted under 35 U.S.C. 154(b) by 0 days.

(21) Appl. No.: 16/491,120

(22) PCT Filed: Mar. 7, 2017

(86) PCT No.: PCT/CN2017/075898
§ 371 (c)(1),
(2) Date: Sep. 4, 2019

(87) PCT Pub. No.: WO2018/161259
PCT Pub. Date: Sep. 13, 2018

(65) Prior Publication Data
US 2020/0014892 A1    Jan. 9, 2020

(51) Int. Cl.
*H04N 9/31*    (2006.01)
*G02B 26/08*    (2006.01)
(Continued)

(52) U.S. Cl.
CPC ....... *H04N 9/3135* (2013.01); *G02B 26/0833* (2013.01); *G02B 26/101* (2013.01);
(Continued)

(58) Field of Classification Search
None
See application file for complete search history.

(56) References Cited

U.S. PATENT DOCUMENTS 7,310,174 B2 *  12/2007  Wine ................... G02B 26/085
                                                                347/233
2001/0055462 A1 *  12/2001  Seibel ................ A61B 1/00048
                                                                385/147
(Continued)

FOREIGN PATENT DOCUMENTS

CN    101518435 A    9/2009
CN    102578993 A    7/2012
(Continued)

*Primary Examiner* — Paulos M Natnael
*Assistant Examiner* — Sean N. Haiem
(74) *Attorney, Agent, or Firm* — LKGlobal | Lorenz & Kopf, LLP

(57) ABSTRACT

The present disclosure provides a laser projection device and a laser projection system. The laser projection device comprises an optical fiber scanner and a MEMS scanning mirror; an optical fiber is disposed on the optical fiber scanner and the optical fiber is used to deliver laser beams needed by projection; the optical fiber scanner drives the optical fiber to scan in a first plane and enables the laser beam to project to the MEMS scanning mirror; and the MEMS scanning mirror makes scanning movement about a first axis and reflects the laser beam to a predetermined area to form a projection image; wherein the first axis is located in the first plane, or the first axis is parallel to the first plane. The present disclosure achieves laser projection by enabling the optical fiber scanner and the MEMS scanning mirror to scan simultaneously in different directions.

15 Claims, 6 Drawing Sheets

(51) Int. Cl.
*G02B 26/10* (2006.01)
*G02B 23/26* (2006.01)
*G02B 27/01* (2006.01)

(52) U.S. Cl.
CPC ......... *G02B 26/103* (2013.01); *G02B 26/105* (2013.01); *H04N 9/317* (2013.01); *H04N 9/3161* (2013.01); *G02B 23/26* (2013.01); *G02B 27/0172* (2013.01); *G02B 2027/0178* (2013.01)

(56) References Cited

U.S. PATENT DOCUMENTS

| | | | | |
|---|---|---|---|---|
| 2002/0064341 A1* | 5/2002 | Fauver | ............... | G02B 6/241 385/25 |
| 2004/0151466 A1* | 8/2004 | Crossman-Bosworth | ............... | G02B 6/25 385/140 |
| 2007/0134615 A1* | 6/2007 | Lovely | ............... | A61B 5/0086 433/29 |
| 2008/0049101 A1* | 2/2008 | Yamazaki | ............... | H04N 3/08 348/97 |
| 2008/0058629 A1* | 3/2008 | Seibel | ............... | A61B 1/0008 600/368 |
| 2014/0035959 A1* | 2/2014 | Lapstun | ............... | G02B 27/0093 345/690 |
| 2014/0177021 A1* | 6/2014 | Shimamoto | ............... | G02B 21/0044 359/200.7 |
| 2016/0313553 A1* | 10/2016 | Song | ............... | G02B 26/101 |
| 2016/0317228 A1* | 11/2016 | Fermann | ............... | A61B 5/0059 |
| 2017/0146458 A1* | 5/2017 | Huber | ............... | G01J 3/10 |

FOREIGN PATENT DOCUMENTS

| | | |
|---|---|---|
| CN | 103782223 A | 5/2014 |
| CN | 105050474 A | 11/2015 |

\* cited by examiner

LASER PROJECTION DEVICE AND LASER PROJECTION SYSTEM

CROSS REFERENCE TO RELATED APPLICATIONS

This application is a U.S. National Stage entry under 35 U.S.C. § 371 based on International Application No. PCT/CN2017/075898, filed on Mar. 7, 2017. The International Application is hereby incorporated herein in its entirety by reference.

TECHNICAL FIELD

This Application pertains to the technical field of laser projection, and particularly to a laser projection device and a laser projection system.

BACKGROUND

Laser projection technology employs laser as the light source for projection display, and as compared with conventional display light sources, laser has very good monochromaticity and directionality and enables projection with higher color gamut. However, the laser projection technology in the prior art still have drawbacks.

For example, the US patent application published as US2008/0249369 and assigned to University of Washington discloses a compact scanning optical fiber device. The scanning optical fiber device has an optical fiber for delivering laser beams, the cantilevered free end of the optical fiber is disposed in a piezoelectric tube, and can be excited by the piezoelectric tube to resonate on an orthogonal axis. The scanning fiber device can work as a projector.

As another example, the US patent application published as US2013/0250388 and assigned to Citizen Holdings Co., Ltd. discloses a scanning image projector and a method of driving the scanning image projector. The scanning image projector has a laser source and a MEMS scanning mirror. A raster scan pattern is formed through dual-axis vibration of the MEMS scanning mirror, and the MEMS works on the dual axes respectively in a slow scan manner and a fast scan manner.

A raster scanning pattern in the prior art is completed by the dual axes driving of the optical fiber or by the dual axes driving of the MEMS scanning mirror.

A further problem in the prior art is that the mirror plate of the MEMS scanning mirror suffers from dynamic deformation and failure upon high-frequency scanning, which reduces the image quality or decreases the service life of the scanning mirror, and limits the availability of scanning at higher frequencies for display with high resolution.

Finally, the actuator in the prior art is a tubular dual-axis optical fiber scanner adapted to generate a spiral scanning mode. If a raster scan image is to be generated, a relatively complicated control structure or algorithm is required. Moreover, when an optical fiber scanner is employed to generate raster scanning, the scanning angle of the slow axis which works at non-resonant mode is limited. In addition, when an optical fiber scanner works at dual-axis scanning, the mechanical performances may be easily affected by the symmetry of the optical fiber itself. In addition, other objects, desirable features and characteristics will become apparent from the subsequent summary and detailed description, and the appended claims, taken in conjunction with the accompanying drawings and this background.

SUMMARY

To improve the prior art and solve one or more technical problems in the prior art, a main objective of the present disclosure is to provide a projection device and a projection system which simultaneously drive an optical fiber and a MEMS scanning mirror to achieve raster projection.

Another objective of the present disclosure further comprises improving the life time of the MEMS scanning mirror and ensuring a high projection image quality. The present disclosure also comprises reducing the requirements on the symmetry of the mechanical structure of the optical fiber for the dual-axes scanning matching, and reducing the requirements on precision machining by realizing two-dimensional raster scanning.

A further objective of the present disclosure is to reduce the complexity of fabrication or control for a raster scanning projection system.

To achieve one or more of the above objectives, the present disclosure respectively teaches the following multiple technical solutions in different embodiments:

According to one aspect of the present disclosure, there is provided a laser projection device, wherein the laser projection device comprises an optical fiber scanner and a MEMS scanning mirror;

the optical fiber scanner comprises an optical fiber which is used to deliver laser beams needed by projection;

the optical fiber scanner drives the optical fiber to scan in a first plane and enables the laser beam to project to the MEMS scanning mirror;

the MEMS scanning mirror scans about the first axis and reflects the laser beam to a predetermined area to form a projection image;

wherein the first axis is located in the first plane, or the first axis is parallel to the first plane.

Optionally, the scan frequency of the optical fiber scanner is higher than the scan frequency of the MEMS scanning mirror.

Optionally, the laser projection device further comprises a scanning signal synchronizing module. The scanning signal synchronizing module sends driving signals to the optical fiber scanner and the MEMS scanning mirror respectively.

Optionally, the scan frequency of the optical fiber scanner is equal to or greater than 20 kHz.

Optionally, the scan frequency of the MEMS scanning mirror is in the range of 60 Hz-120 Hz as the refresh frequency of the projection images or videos.

Optionally, the driving mechanism of the optical fiber scanner and/or the MEMS scanning mirror can be electromagnetic, electrothermal, electrostatic or piezoelectric.

Optionally, the laser projection device further comprises an optical lens module disposed on the laser beam path. The optical lens module is used to converge and trim the laser beam.

Optionally, the optical fiber scanner drives the optical fiber to scan in a first-order resonant mode, and the optical lens module is disposed between the optical fiber scanner and the MEMS scanning mirror or disposed between the MEMS scanning mirror and the predetermined area.

Optionally, the optical fiber scanner drives the optical fiber to scan in a second-order resonant mode, and the optical lens module is attached at the tip of the optical fiber that delivers the laser beam.

Optionally, the optical fiber scanner and the MEMS scanning mirror are controlled synchronously to generate a raster scan pattern.

Optionally, a planar size of the MEMS scanning mirror is equal to or below 4 mm*4 mm.

Optionally, the optical fiber scanner and the MEMS scanning mirror each are set as a single-axis driving structure; and the optical fiber scanner further comprises a substrate and an actuator, the actuator is disposed on the substrate, and the optical fiber is disposed on an upper surface of the actuator.

Optionally, the optical fiber scanner and the MEMS scanning mirror each are set as a dual-axis driving structure; and the optical fiber scanner further comprises an actuator tube, the optical fiber is disposed on a central axis of the actuator tube, the actuator tube is able to respectively drive the optical fiber to scan in two planes which are perpendicular to each other; or the optical fiber scanner further comprises two actuators, the two actuators are respectively disposed on two perpendicular sides of the optical fiber and are able to respectively drive the optical fiber to scan in two planes which are perpendicular to each other.

Optionally, driving directions of the optical fiber scanner and the MEMS scanning mirror are able to be switched synchronously, and after the switching, the optical fiber scanner drives the optical fiber to scan in a second plane and enables the laser beam to project to the MEMS scanning mirror; and the MEMS scanning mirror makes a scanning about a second axis and reflects the laser beam to the predetermined area to form the projection image;

wherein the second axis is located in the second plane or parallel to the second plane; and the second plane is perpendicular to the first plane, and the second axis is perpendicular to the first axis.

Optionally, the laser projection device further comprises a driving direction switch, the driving direction switch synchronously switching the driving directions of the optical fiber scanner and the MEMS scanning mirror.

Optionally, the diameter of the laser projection device is equal to or below 6 mm.

Optionally, the optical fiber is a uniform cylindrical optical fiber or a tapered optical fiber.

According to another aspect of the present disclosure, a laser projection system is demonstrated, wherein a laser projection device of any one of the above items is disposed in the laser projection system.

Optionally, the laser projection system is a pair of augmented reality glasses, and the laser projection device is disposed in a frame of the pair of augmented reality glasses;

or, the laser projection system is an endoscope, and the laser projection device is disposed in a probe of the endoscope;

or, the laser projection system is a cell phone, and the laser projection device is embedded in the cell phone;

or, the laser projection system is a watch, and the laser projection device is embedded in a dial or a watchband of the watch.

Different from the manner in the prior art that the optical fiber scanner or the MEMS scanning mirror makes dual-axis movement individually to implement projection, the present disclosure achieves laser projection by enabling the optical fiber scanner and the MEMS scanning mirror to scan simultaneously in different directions, and has a unique technical effect.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Embodiments of the present disclosure will be further described in detail with reference to the figures to make the objectives, technical solutions and advantages of the present disclosure more apparent.

Figure 1:
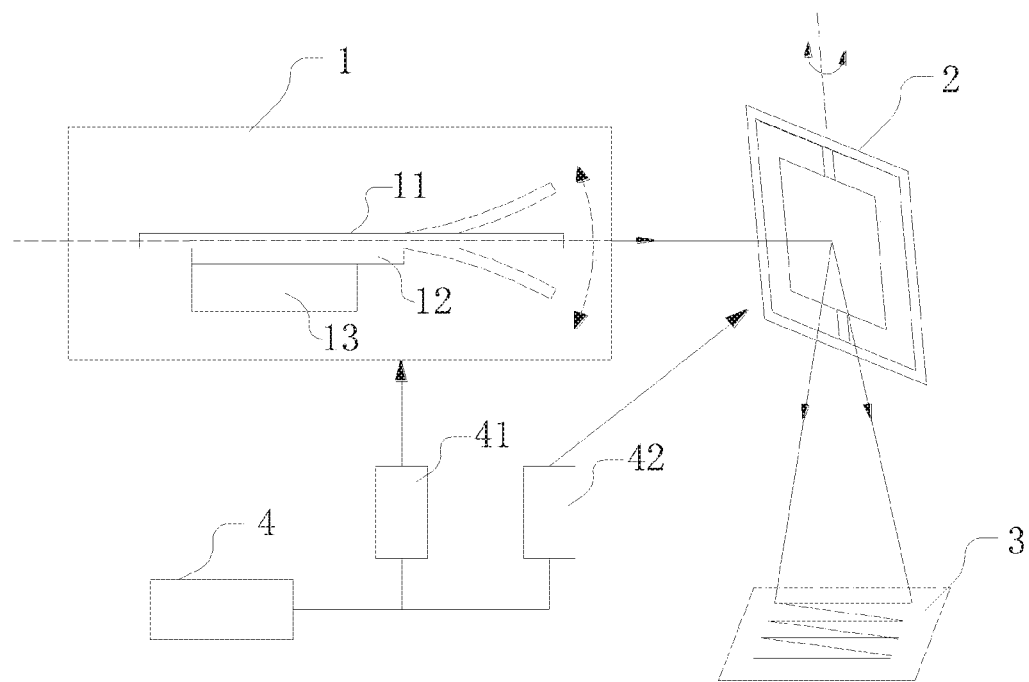
FIG. 1 is a schematic view of an embodiment of a laser projection device according to the present disclosure.
Figure 2:
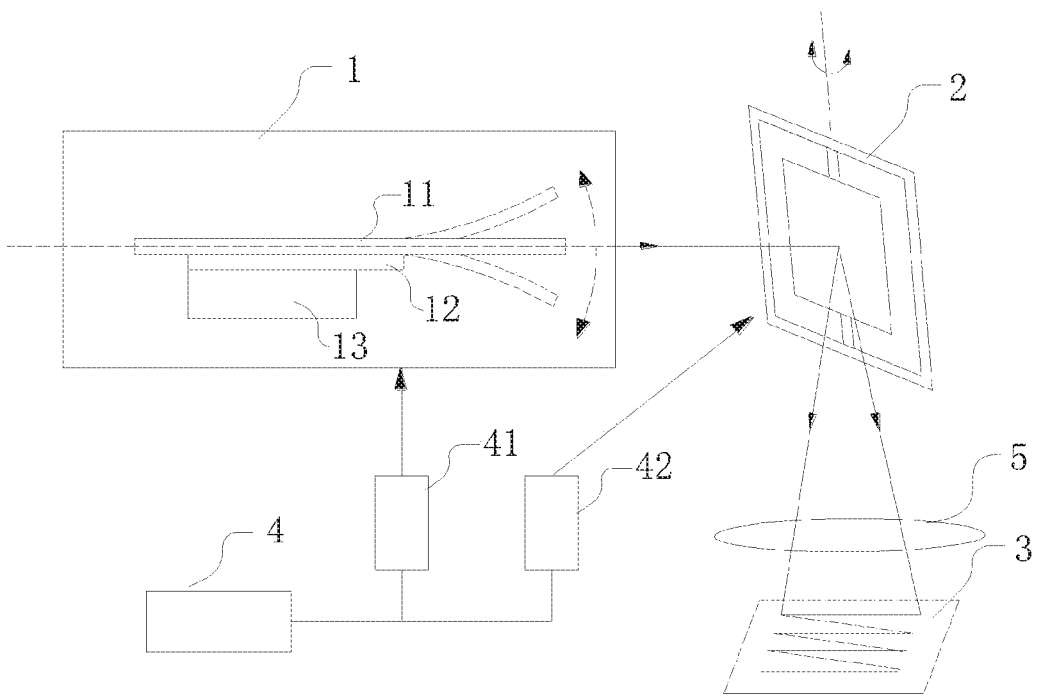
FIG. 2 is a schematic view of another embodiment of a laser projection device according to the present disclosure.
Figure 3:
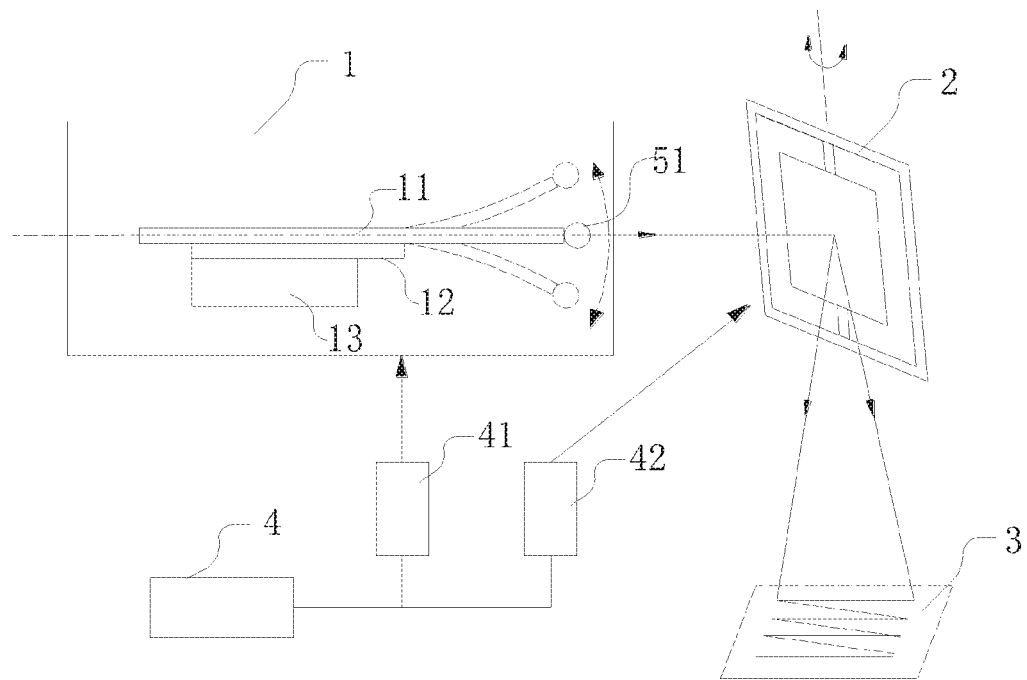
FIG. 3 is a schematic view of another embodiment of a laser projection device according to the present disclosure.

FIGS. 1-3 respectively show an embodiment of a laser projection device.

As shown in FIG. 1, a laser projection device comprises an optical fiber scanner 1 and a MEMS scanning mirror 2. The optical fiber scanner 1 includes an optical fiber 11. The optical fiber 11 is used to deliver a laser beam needed by projection. The optical fiber scanner 1 drives the optical fiber 11 to scan in a first plane and enables the laser beam delivered by the optical fiber 11 to project to the MEMS scanning mirror 2. The MEMS scanning mirror 2 makes scanning about the first axis and reflects the laser beam to a predetermined area 3 to form a projection image. The first axis is located in the first plane, or the first axis is parallel to the first plane, that is, the direction of the scanning movement of the MEMS scanning mirror 2 is perpendicular to the direction of the scanning movement of the optical fiber 11. As shown in FIG. 1, the first plane in which the optical fiber 11 scans is the paper surface; the first axis about which the MEMS scanning mirror 2 rotates reciprocatingly is in the paper surface; and the MEMS scanning mirror 2 scans in and out of the paper surface. In this embodiment, the horizontal direction and the vertical direction of the raster scanning image are respectively completed by the scan of the optical fiber 11 and the scan of the MEMS scanning mirror 2. For example, the scan in the horizontal direction is completed by the scan of the optical fiber 11, and the scan in the vertical direction is completed by the scan of the MEMS scanning mirror 2, or vice versa. In addition, in this embodiment, the optical fiber 11 may only be able to scan in one plane, and the MEMS scanning mirror 2 may only be able to make reciprocating scanning movement about one axis. The structure of this embodiment can reduce the complexity of the device and facilitate miniaturization.

Specifically, the laser beam projected by the optical fiber 11 may be monochromatic all the time, which achieves monochromatic projection image. Alternatively, the present disclosure may, according to the image information to be displayed, change the light intensity and the color of the laser beam projected by the optical fiber 11 by using time divisional multiplex method, so that the laser beam projected by the optical fiber 11 conforms to the laser color and the light intensity at a certain moment and at a certain projection point location. For example, at a certain moment, the optical fiber 11 projects a yellow laser beam to a projection point location, and at a moment thereafter, the optical fiber 11 projects a blue laser beam to the same projection point location. The interval between the two moments is very small, and the projection color observed by human eyes is the superimposition of the projection colors of the two times, thereby realizing the change of the projection point color and achieving colored projection. Alternatively, another method of colored projection is by using an RGB single mode optical fiber, and with respect to the information of each of the pixel dots, directly projecting a light beam that was mixed in the input part of an RGB light source.

Preferably, the scan frequency of the optical fiber scanner 1 is higher than the scan frequency of the MEMS scanning mirror 2. Specifically, the scan frequency of the optical fiber scanner 1 is equal to or greater than 20 kHz, and the MEMS scanning mirror 2 scans with the refresh frequency of displayed images, that is, 60 Hz-120 Hz. The MEMS scanning mirror 2 is not required to perform high-frequency scanning, thereby avoids the problem of dynamic deformation of the axis in case the MEMS scanning mirror scans at a high speed and facilitating improvement of the projection display quality.

In all embodiments shown in FIGS. 1-3, the laser projection device further comprises a scanning signal synchronizing module 4. The scanning signal synchronizing module 4 comprises an optical fiber scanner driving module 41 and a MEMS scanning mirror driving module 42. The optical fiber scanner driving module 41 and the MEMS scanning mirror driving module 42 send a driving signal to the optical fiber scanner 1 and the MEMS scanning mirror 2 respectively to drive the optical fiber scanner 1 and the MEMS scanning mirror 2 to scan. Specifically, a driving manner of the optical fiber scanner 1 and/or the MEMS scanning mirror 2 is electromagnetic driving, thermoelectric driving, electrostatic driving or piezoelectric driving. Furthermore, the laser projection device in these embodiments may further comprise means for driving to change the inclination angle of the MEMS scanning mirror 2 to thereby adjust the position of the projection image.

Preferably, the optical fiber scanner 1 and the MEMS scanning mirror 2 are controlled synchronously to generate a raster scan pattern.

Preferably, in the embodiments shown in FIG. 2 and FIG. 3, the laser projection device further comprises an optical lens module disposed on a laser beam path, and the optical lens module is used to converge and trim the laser beam to make the displayed image with high quality. The optical lens module may be arranged in the following manner:

In the embodiment as shown in FIG. 2, the optical lens module 5 is disposed between the MEMS scanning mirror 2 and the predetermined area 3; or, in the embodiment as shown in FIG. 3, the optical lens module 5 is specially a spherical lens 51 which is disposed at the end of the optical fiber 11 that emits the laser beam. Specifically, the spherical lens 51 may be produced separately and then fused to an end of the optical fiber 11. The optical fiber 11 may be separately processed, for example, by wet etching or laser etching, to form a specific structure, in order to meet the requirements on specific working frequencies or scanning amplitude. The optical property of the processed optical fiber 11 should still satisfy the normal requirements after the processing.

As shown in FIG. 2, when the optical fiber 11 scans in a first-order resonant mode, the optical lens module 5 may be disposed between the MEMS scanning mirror 2 and the predetermined area 3, whereupon the first-order resonant mode can meet the requirement on vibration amplitude. Alternatively, the optical lens module 5 may also be disposed between the optical fiber scanner 1 and the MEMS scanning mirror 2. As shown in FIG. 3, when the optical fiber 11 scans in a second-order resonant mode, a convergent lens module for convergence purpose, for example, a spherical lens 51, is preferably disposed at the tip of the optical fiber 11. After the tip of the optical fiber 11 is provided with the spherical lens 51, the mass of the tip of the optical fiber 11 increases. In such a case, the second-order resonant mode is employed to meet the requirement on vibration amplitude of the scanning of the optical fiber 11. An effect of the optical fiber working in the second-order resonant mode and the spherical lens being disposed at the end of the optical fiber is that the lens can be made very small, which facilitates the miniaturization of the device or the system. Certainly, when the optical fiber 11 works in the second-order resonant mode, the convergent lens may also be disposed between the MEMS scanning mirror 2 and the predetermined area 3. In a further embodiment, when the optical fiber 11 works in the second-order resonant mode, the present disclosure may simultaneously provide the convergent lens at the end of the optical fiber and between the MEMS scanning mirror 2 and the predetermined area 3, which may facilitate the size of the spherical lens at the end of the optical fiber and facilitate the adjustment of the vibration amplitude of the optical fiber. Additionally, in the schematic views of FIG. 1, FIG. 2 and FIG. 3, the employed optical fiber 11 may be a common cylindrical optical fiber, and may also be an optical fiber that has be processed and thus has a special structure (for example, a tapered optical fiber with varying cross sections), so as to realize the frequencies or amplitudes that are required by scanning.

Figure 4:
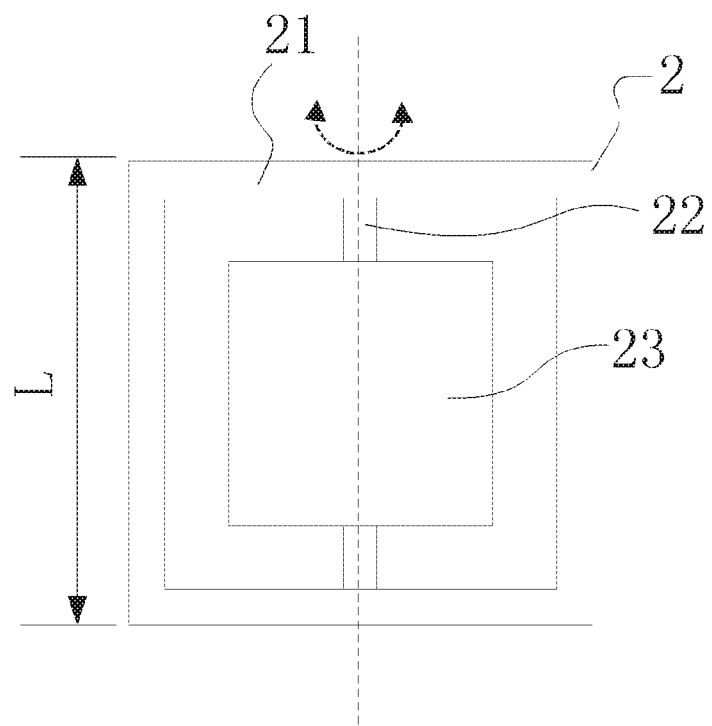
FIG. 4 is a schematic view of a MEMS scanning mirror with a single-axis driving structure.

FIG. 4 is a schematic view of a MEMS scanning mirror with a single-axis driving structure. The embodiments shown in FIGS. 1-3 may all employ the MEMS scanning mirror 2 with a single-axis driving structure. Referring to FIG. 4, the MEMS scanning mirror 2 with the single-axis driving structure comprises a first outer frame 21, a first connection member 22 and a reflective mirror 23. The reflective mirror 23 is connected with the first outer frame 21 via the first connection member 22, and the reflective mirror 23 reciprocatingly rotates within a certain angular range. The arrangement direction (as shown by the dotted line) of the first connection member 22 is regarded as the rotation axis. The reflective mirror 23 reflects the laser beam. The MEMS scanning mirror 2 with the single-axis driving structure is simple in structure and easy to manufacture and assemble and has a size with a side length as small as L=2-4 mm. In other words, the planar area of the MEMS scanning mirror 2 may be equal to or below 4 mm*4 mm, so that the structure of the laser projection device is more compact and facilitates the miniaturization and portability of the device Referring to FIG. 1 and FIG. 4, the optical fiber scanner 1 is also arranged as a single-axis driving structure. The optical fiber scanner 1 comprises a substrate 13, a piezoelectric actuator 12 and an optical fiber 11. The piezoelectric actuator 12 is disposed on the substrate 13, and the optical fiber 11 is disposed on the surface of the piezoelectric actuator 12. Driven by the piezoelectric actuator 12, the optical fiber 11 scans in the first plane (paper surface) and projects the laser beam to the reflective mirror 23 of the MEMS scanning mirror 2. The MEMS scanning mirror 2, under the control of the MEMS scanning mirror driving module 42, reciprocatingly rotates about the first axis, and it is the reflective mirror 23 that reflects the laser beam to the predetermined area 3 to form projection. In other embodiments, the piezoelectric actuator 12 may be replaced with an electromagnetic driver, a thermoelectric driver or an electrostatic driver.

In other embodiments of the laser projection device, the optical fiber scanner 1 and the MEMS scanning mirror 2 may be arranged as a dual-axis driving structure.

Figure 5:
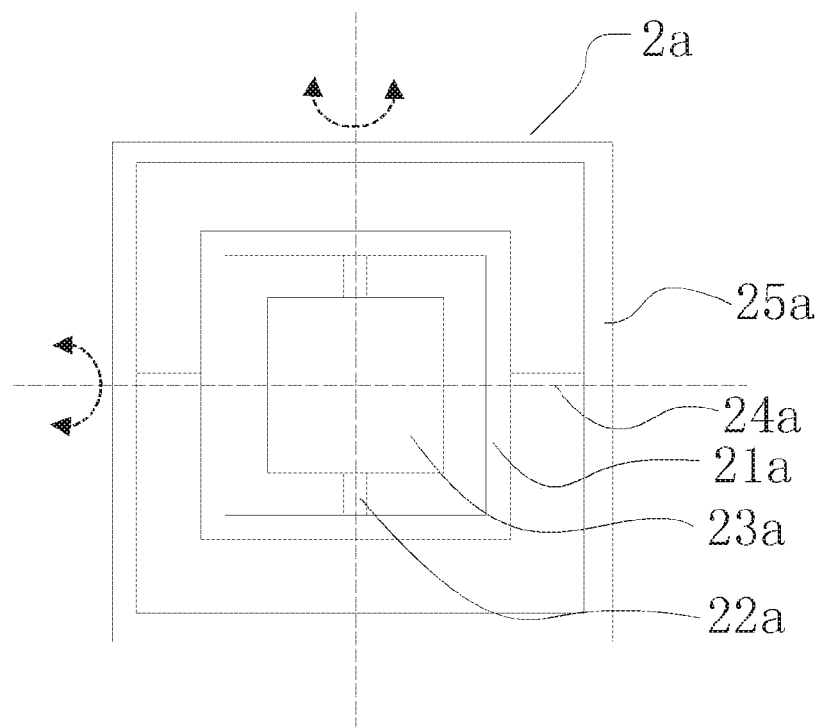
FIG. 5 is a schematic view of a MEMS scanning mirror with a dual-axis driving structure.

FIG. 5 is a schematic view of an embodiment of the MEMS scanning mirror with a dual-axis driving structure. Different from the above-mentioned patent (US 2013/0250388), in this application the dual axes will not be in an operating state simultaneously. As shown in FIG. 5, the MEMS scanning mirror 2a with the dual-axis driving structure comprises a first outer frame 21a, a first connection member 22a, a reflective mirror 23a, a second outer frame 25a and a second connection member 24a. The reflective mirror 23a is connected with the first outer frame 21a via the first connection member 22a. The first outer frame 21a is connected with the second outer frame 25a via the second connection member 24a. The reflective mirror 23a can reciprocatingly rotates about the axial direction of the first connection member 22a or about the axial direction of the second connection member 24a.

Figure 6:
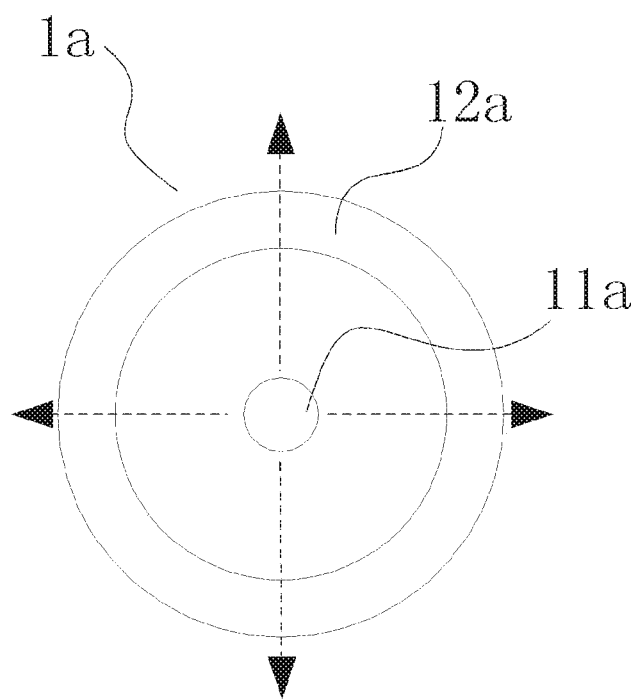
FIG. 6 is a schematic cross-sectional view of an embodiment of an optical fiber scanner with a dual-axis driving structure.
Figure 7:
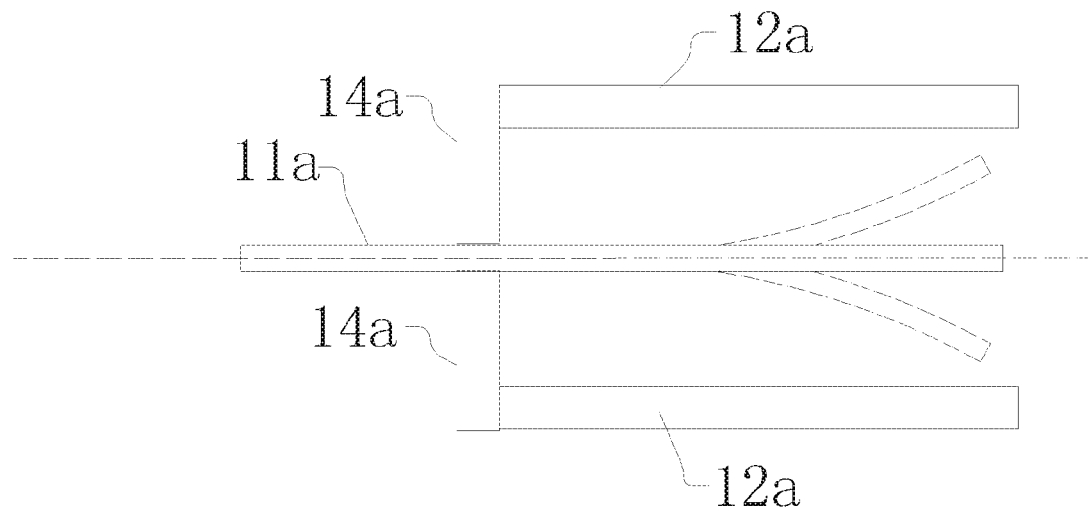
FIG. 7 is a schematic structural cross-sectional view of the optical fiber scanner with a dual-axis driving structure shown in FIG. 6
Figure 8:
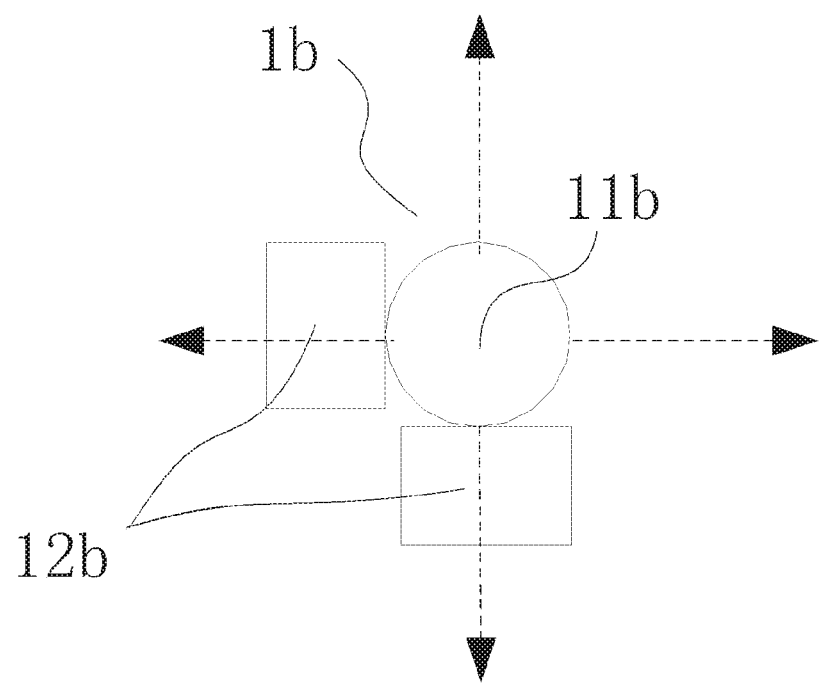
FIG. 8 is a schematic cross-sectional view of another embodiment of an optical fiber scanner with a dual-axis driving structure.

FIG. 6 and FIG. 8 are schematic views of two embodiments of an optical fiber scanner with a dual-axis driving structure. Different from the above-mentioned patent (US 2008/0249369), in this application the dual axes will not be in an operating state simultaneously. In FIG. 6, the optical fiber scanner 1a with the dual-axis driving structure comprises an optical fiber 11a and an actuator tube 12a. The optical fiber 11a is disposed on a central axis of the actuator tube 12a. The actuator tube 12a can respectively drive the optical fiber 11a to scan in two planes which are perpendicular to each other, as shown by the arrows in the figure. The optical fiber 11a establishes a mechanical connection with the actuator tube 12a in front of the free scanning end. Specifically, as shown in FIG. 7, one end of the optical fiber 11a may be physically coupled with the actuator tube 12a via one or more intermediate components. For example, the intermediate components may be an annular plug 14a, wherein a side of the annular plug 14a is mechanically connected with the actuator tube 12a, and the middle of the annular plug 14a is provided with an aperture for the insertion of the optical fiber 11a. Furthermore, the optical fiber 11a may be adhered in the aperture by using an adhesive to strengthen the connection. Alternatively, as shown in FIG. 8, the optical fiber scanner 1b with the dual-axis driving structure comprises an optical fiber 11b and two actuators 12b. The two actuators 12b are respectively disposed on two perpendicular sides of the optical fiber 11b and respectively drive the optical fiber 11b to scan in two planes which are perpendicular to each other, as shown by the arrows in the figure. Preferably, the two actuators 12b do not contact each other, thereby avoiding interfering with each other's actions.

Preferably, when the optical fiber scanner and the MEMS scanning mirror both employ the dual-axis driving structure, the laser projection device further comprises a driving direction switch. The driving direction switch synchronously switch the driving directions of the optical fiber scanner and the MEMS scanning mirror. After the switching, the optical fiber scanner drives the optical fiber to scan in the second plane and enables the laser beam to project to the MEMS scanning mirror. The MEMS scanning mirror makes a reciprocating scanning movement about a second axis and reflects the laser beam to the predetermined area to form the projection image, wherein the second axis is located in the second plane, the second plane is perpendicular to the first plane, and the second axis is perpendicular to the first axis. The above direction switching can achieve 90° rotation of the laser projection image, for example, switching the displaying from the horizontal direction to the vertical direction.

In the above embodiments, the diameter of the laser projection device may be made to be equal to or below 6 mm so that the laser projection device can be disposed in some small-sized laser projection systems.

The laser projection system may be a pair of augmented reality glasses, and the laser projection device is disposed in the frame of the pair of augmented reality glasses so that the augmented reality glasses worn by a user can conveniently project the images and the user can view the images conveniently. Alternatively, the laser projection system may be an endoscope, the laser projection device is disposed in a probe of the endoscope, and the endoscope is used to emit optical signals to or gather optical signals to from the narrow space. Alternatively, the laser projection system is a cell phone, and the laser projection device is embedded in the cell phone. Alternatively, the laser projection system is a watch, and the laser projection device is embedded in a dial or a watchband of the watch.

Figure 9:
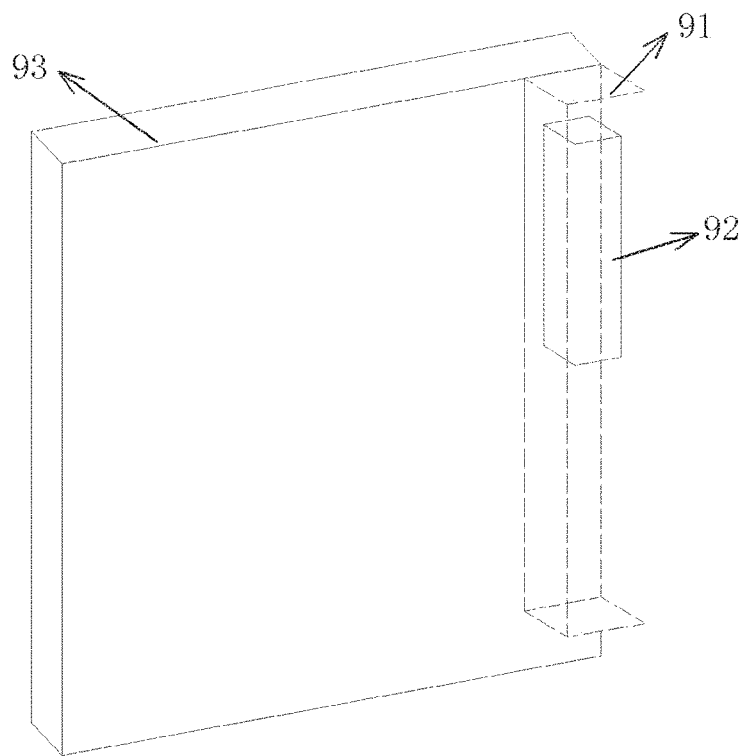
FIG. 9 is a structural schematic view of augmented reality glasses.
Figure 10:
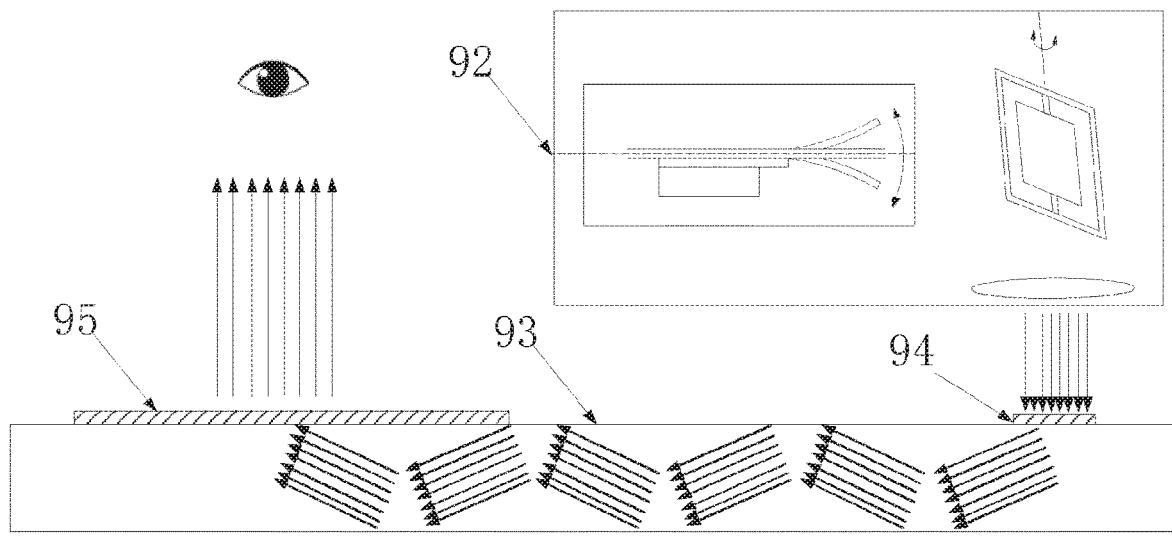
FIG. 10 is a schematic view of a projection optical path of augmented reality glasses.

FIG. 9 is a structural schematic view of augmented reality glasses. As shown in FIG. 9, the augmented reality glasses comprise a frame 91, a laser projection device 92 and a lens 93. The lens 93 is a transparent lens. The reference number of 94 indicates a functional structure for implementing optical coupling, and the reference number of 95 indicates a functional structure for implementing optical decoupling. The augmented reality glasses can be used as an optical device for augmented reality. FIG. 10 is a schematic view of a projection display optical path. The laser beam delivered by the laser projection device 92 is incident from a side of the lens 93, goes through full reflection for several times, exits from a display module of the lens 93 and enters human eyes so that the user upon wearing the augmented reality glasses can conveniently observe the projected images and achieve an augmented reality effect. In FIG. 10, the laser projection device 92 and the display module of the lens 93 are both located on the side of the lens 93 towards the human eyes. Certainly, the laser projection device 92 and the display module of the lens 93 may also be disposed on the side of the lens 93 away from the human eyes.

Figure 11:
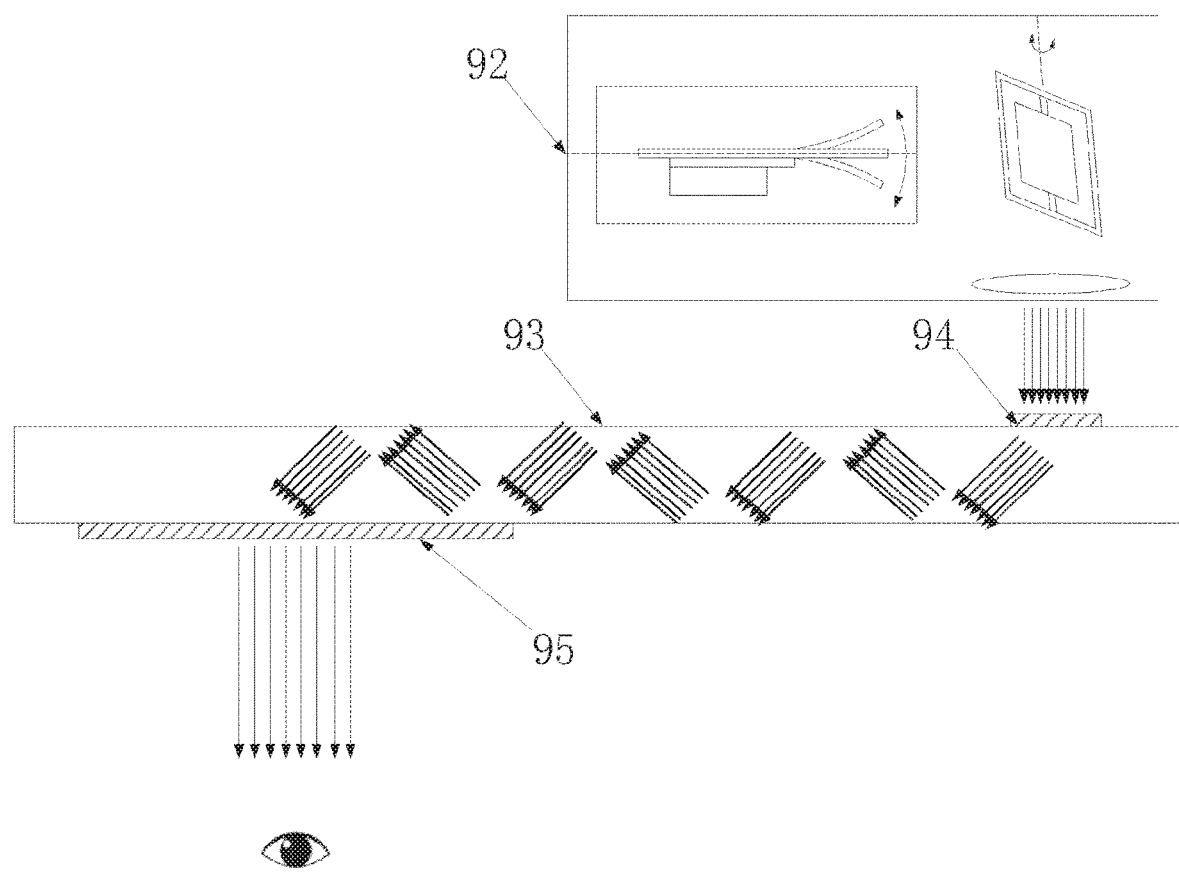
FIG. 11 is a schematic view of another projection optical path of augmented reality glasses.

FIG. 11 is a schematic view of another projection optical path of the augmented reality glasses. As shown in FIG. 11, the laser projection device 92 and the display module of the lens 93 are located on both sides of the lens 93.

The above are only specific embodiments of the present disclosure. Due to the teaching of the present disclosure, those skilled in the art can make other modifications or variations thereto on the basis of the above embodiments.

Those skilled in the art should appreciate that the above specific descriptions are only intended to better illustrate the objectives of the present disclosure, and the protection scope of the present disclosure should be subject to the protection scope as defined by the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A laser projection device, wherein the laser projection device comprises an optical fiber scanner and a MEMS scanning mirror;
    the optical fiber scanner comprises an optical fiber which is used to deliver a laser beam needed by projection;
    the optical fiber scanner drives the optical fiber to scan in a first plane and enables the laser beam to project to the MEMS scanning mirror; and
    the MEMS scanning mirror makes scanning movement about a first axis and reflects the laser beam to a predetermined area to form a projection image;
    wherein the first axis is located in the first plane, or the first axis is parallel to the first plane, and a scan frequency of the optical fiber scanner is higher than the scan frequency of the MEMS scanning mirror;
    wherein the optical fiber scanner and the MEMS scanning mirror each are set as a dual-axis driving structure, and when being used, only one axis of the dual-axis driving structure of the MEMS scanning mirror is in an operating state, and only one axis of the dual-axis driving structure of the optical fiber scanner is in an operating state;
    the laser projection device further comprises a driving direction switch, the driving direction switch synchronously switching the driving directions of the optical fiber scanner and the MEMS scanning mirror, and after driving directions of the optical fiber scanner and the MEMS scanning mirror are switched synchronously, the optical fiber scanner drives the optical fiber to scan in a second plane and enables the laser beam to project to the MEMS scanning mirror; and
    the MEMS scanning mirror makes a scanning movement about a second axis and reflects the laser beam to the predetermined area to form the projection image;
    wherein the second axis is located in the second plane or parallel to the second plane;
and the second plane is perpendicular to the first plane, and the second axis is perpendicular to the first axis.

2. The laser projection device according to claim 1, wherein the laser projection device further comprises a scanning signal synchronizing module, and the scanning signal synchronizing module sends driving signals to the optical fiber scanner and the MEMS scanning mirror respectively to drive the optical fiber scanner and the MEMS scanning mirror to scan, and the optical fiber scanner and the MEMS scanning mirror are controlled synchronously to generate a raster scan pattern.

3. The laser projection device according to claim 1, wherein the laser projection device further comprises an optical lens module disposed on a laser beam path, and the optical lens module is used to converge and trim the laser beam.

4. The laser projection device according to claim 3, wherein the optical fiber scanner drives the optical fiber to scan in a first-order resonant mode, and the optical lens module is disposed between the optical fiber scanner and the MEMS scanning mirror or disposed between the MEMS scanning mirror and the predetermined area.

5. The laser projection device according to claim 3, wherein the optical fiber scanner drives the optical fiber to scan in a second-order resonant mode, and the optical lens module is attached at a tip of the optical fiber that delivers the laser beam.

6. The laser projection device according to claim 1, wherein
    the optical fiber scanner further comprises an actuator tube, the optical fiber is disposed on a central axis of the actuator tube, the actuator tube is able to respectively drive the optical fiber to scan in two planes which are perpendicular to each other; or the optical fiber scanner further comprises two actuators, the two actuators are respectively disposed on two perpendicular sides of the optical fiber and are able to respectively drive the optical fiber to scan in two planes which are perpendicular to each other;
    the MEMS scanning mirror comprises a first outer frame, a first connection member, a reflective mirror, a second outer frame and a second connection member, wherein the reflective mirror is connected with the first outer frame via the first connection member, the first outer frame is connected with the second outer frame via the second connection member, and the reflective mirror can reciprocatingly rotates about the axial direction of the first connection member or about the axial direction of the second connection member.

7. The laser projection device according to claim 1, the optical fiber is a uniform cylindrical optical fiber or a tapered optical fiber.

8. A laser projection system, wherein a laser projection device is disposed in the laser projection system, the laser projection device comprises an optical fiber scanner and a MEMS scanning mirror;
    the optical fiber scanner comprises an optical fiber which is used to deliver a laser beam needed by projection;
    the optical fiber scanner drives the optical fiber to scan in a first plane and enables the laser beam to project to the MEMS scanning mirror; and
    the MEMS scanning mirror makes scanning movement about a first axis and reflects the laser beam to a predetermined area to form a projection image;
    wherein the first axis is located in the first plane, or the first axis is parallel to the first plane, and a scan frequency of the optical fiber scanner is higher than the scan frequency of the MEMS scanning mirror;
    wherein the optical fiber scanner and the MEMS scanning mirror each are set as a dual-axis driving structure, and when being used, only one axis of the dual-axis driving structure of the MEMS scanning mirror is in an operating state, and only one axis of the dual-axis driving structure of the optical fiber scanner is in an operating state;
    the laser projection device further comprises a driving direction switch, the driving direction switch synchronously switching the driving directions of the optical fiber scanner and the MEMS scanning mirror, and after driving directions of the optical fiber scanner and the MEMS scanning mirror are switched synchronously, the optical fiber scanner drives the optical fiber to scan in a second plane and enables the laser beam to project to the MEMS scanning mirror; and the MEMS scanning mirror makes a scanning movement about a second axis and reflects the laser beam to the predetermined area to form the projection image;

wherein the second axis is located in the second plane or parallel to the second plane;

and the second plane is perpendicular to the first plane, and the second axis is perpendicular to the first axis.

9. The laser projection system according to claim 8, wherein the laser projection system is a pair of augmented reality glasses, and the laser projection device is disposed in a frame of the augmented reality glasses;

or, the laser projection system is an endoscope, and the laser projection device is disposed in a probe of the endoscope;

or, the laser projection system is a cell phone, and the laser projection device is embedded in the cell phone;

or, the laser projection system is a watch, and the laser projection device is embedded in a dial or a watchband of the watch.

10. The laser projection system according to claim 8, wherein the laser projection device further comprises a scanning signal synchronizing module, and the scanning signal synchronizing module sends driving signals to the optical fiber scanner and the MEMS scanning mirror respectively to drive the optical fiber scanner and the MEMS scanning mirror to scan, and the optical fiber scanner and the MEMS scanning mirror are controlled synchronously to generate a raster scan pattern.

11. The laser projection system according to claim 8, wherein the laser projection device further comprises an optical lens module disposed on a laser beam path, and the optical lens module is used to converge and trim the laser beam.

12. The laser projection system according to claim 11, wherein the optical fiber scanner drives the optical fiber to scan in a first-order resonant mode, and the optical lens module is disposed between the optical fiber scanner and the MEMS scanning mirror or disposed between the MEMS scanning mirror and the predetermined area.

13. The laser projection system according to claim 11 wherein the optical fiber scanner drives the optical fiber to scan in a second-order resonant mode, and the optical lens module is attached at a tip of the optical fiber that delivers the laser beam.

14. The laser projection system according to claim 8, wherein the optical fiber scanner further comprises an actuator tube, the optical fiber is disposed on a central axis of the actuator tube, the actuator tube is able to respectively drive the optical fiber to scan in two planes which are perpendicular to each other; or the optical fiber scanner further comprises two actuators, the two actuators are respectively disposed on two perpendicular sides of the optical fiber and are able to respectively drive the optical fiber to scan in two planes which are perpendicular to each other;

the MEMS scanning mirror comprises a first outer frame, a first connection member, a reflective mirror, a second outer frame and a second connection member, wherein the reflective mirror is connected with the first outer frame via the first connection member, the first outer frame is connected with the second outer frame via the second connection member, and the reflective mirror can reciprocatingly rotates about the axial direction of the first connection member or about the axial direction of the second connection member.

15. The laser projection system according to claim 8, the optical fiber is a uniform cylindrical optical fiber or a tapered optical fiber.

* * * * *